United States Patent [19]

Kawahara et al.

[11] Patent Number: 5,151,295
[45] Date of Patent: Sep. 29, 1992

[54] PROCESS FOR MANUFACTURING AN OPTICAL RECORDING MEDIUM

[75] Inventors: Katsumi Kawahara; Masami Uchida, both of Osaka; Kazumi Yoshioka, Kyoto; Takeo Ohta, Nara; Keiichiro Horai, Osaka, all of Japan

[73] Assignee: Matsushita Electric Industrial Co., Ltd., Osaka, Japan

[21] Appl. No.: 599,692

[22] Filed: Oct. 18, 1990

[30] Foreign Application Priority Data

Jul. 11, 1990 [JP] Japan ................................. 2-153250

[51] Int. Cl.$^5$ ............................................. B05D 5/06
[52] U.S. Cl. .................................... 427/12; 427/162; 427/240; 427/299; 427/402
[58] Field of Search .................... 427/10, 162, 12, 240, 427/299, 402

[56] References Cited

U.S. PATENT DOCUMENTS

| | | | |
|---|---|---|---|
| 3,492,491 | 12/1970 | Beeh ................................... | 250/222 |
| 3,773,548 | 11/1973 | Baker et al. ....................... | 117/106 R |
| 4,457,794 | 6/1984 | Kotera et al. ..................... | 156/64 |
| 4,676,646 | 6/1990 | Strand et al. ..................... | 356/381 |

OTHER PUBLICATIONS

Optical Interference Method For The Approximate Determination Of Refractive Index And Thickness Of A Transparent Layer by Alvin M. Goodman, published in the Sep. 1, 1978 issue of Applied Optics.
Thickness Measurements Of Film On Transparent Substrates By Photoelectric Detection Of Interference Fringes by Pierce and Venard, published in the reviews of Scientific Instruments, vol. 45, No. 1, Jan. 1974.

*Primary Examiner*—Bernard Pianalto
*Attorney, Agent, or Firm*—Amster, Rothstein & Ebenstein

[57] ABSTRACT

A method of depositing the layers of an optical recording medium to their requisite thicknesses is disclosed in which optical monitoring of the reflectivity of a first dielectric layer during deposition is used to determine the deposition rate. The reflectivity is monitored to determine the time period in which the reflectivity reaches a maximum or minimum value, which occurs when the layer is a quarter wave thick. The deposition rate is derived from that time period, and the deposition is continued for a time in accordance with the deposition rate until the requisite thickness of the first dielectric layer is obtained. The second dielectric layer is deposited for a lesser time period in accordance with the deposition rate which has been optically derived during deposition of the first dielectric layer.

27 Claims, 3 Drawing Sheets

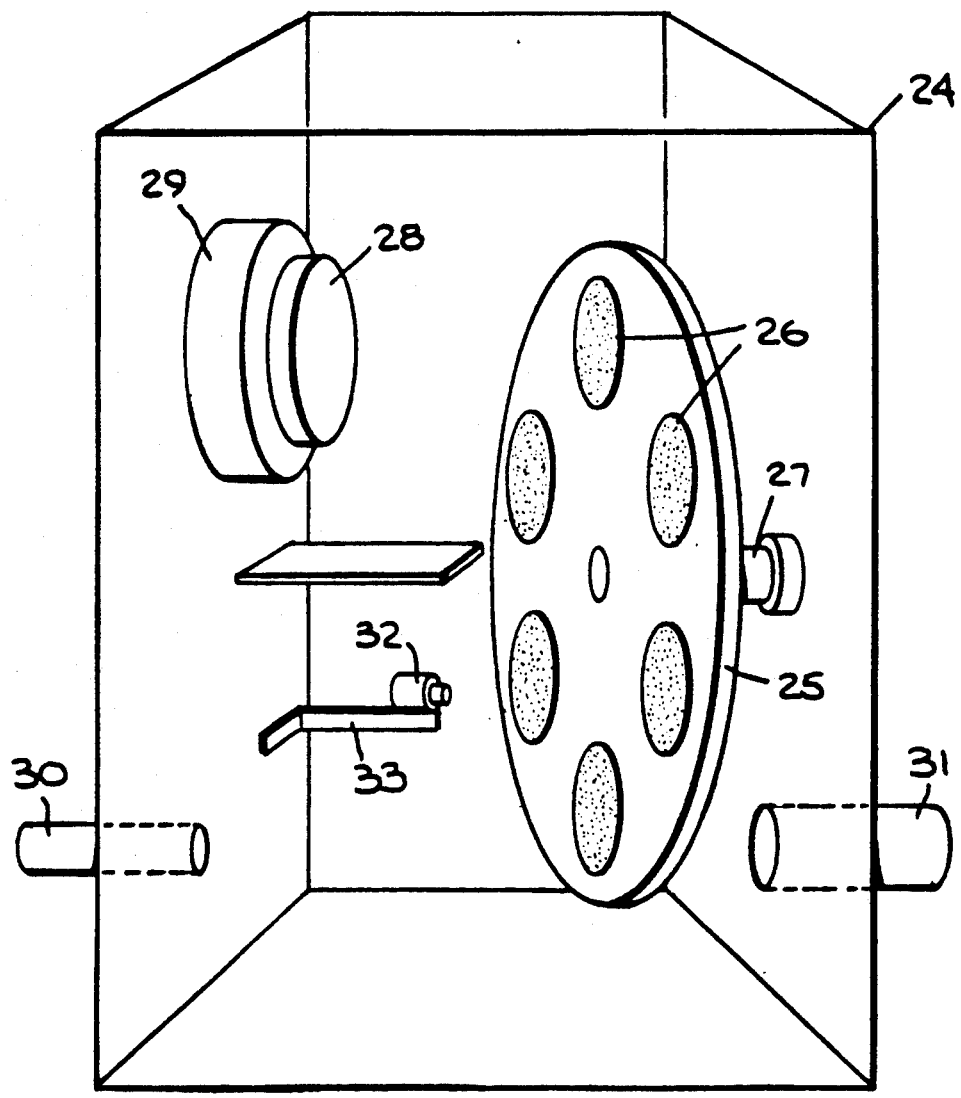

PROCESS FOR MANUFACTURING AN OPTICAL RECORDING MEDIUM

This invention relates to optical information storage media in which information may either be recorded or erased by causing structural changes in the atomic arrangement of a thin film recording layer. These structural changes are produced by controllably elevating the temperature of the thin film recording layer. Optical irradiation of the thin film recording layer with laser light or other energetic radiation may be used for this purpose. The present invention is directed to processes for manufacturing the various layers that form the optical recording medium which permit these layers to be deposited to their appropriate thicknesses.

BACKGROUND OF THE INVENTION

Optical recording media, such as large memory capacity optical discs, are known in the prior art to include non-erasable write-once systems which utilize as a recording layer a $TeO_x$ ($0 < x < 2.0$) thin film formed from Te and $TeO_2$. Erasable discs are also known in which it is possible to repeatedly write and erase information by the application of optical energy. In such erasable optical discs, a thin film layer of recording material is heated and melted by laser light, then rapidly cooled so that its atomic structure is transformed into a substantially non-crystalline or amorphous state. Recorded information may be distinguished from the unrecorded regions of the optical disc by the optical properties of the amorphous state. The recorded information may subsequently be erased by again heating the thin film recording layer, and allowing it to cool so that its atomic structure is permitted to anneal This process transforms the heated regions of the recording layer into a substantially crystalline state which has optical properties which differ from that of the amorphous state to indicate thereby an erased condition. Reading of the recorded information is accomplished by utilizing a low power laser beam which does not create any structural changes in the recording layer.

Typically, laser light is focused to a spot of approximately 1 micron in diameter on the optical recording medium to heat a correspondingly small region of the thin film recording layer. Although heating occurs for only a short period of time, the recording layer is generally sandwiched between two heat resistant dielectric layers formed from $SiO_2$ or other dielectric materials so as to avoid thermally damaging other layers of the recording medium. In some optical disc structures, the dielectric layer which covers the top of the thin film recording layer is itself covered by a reflecting layer, so that the laser beam may be reflected thereby. By incorporating a reflecting layer, the sensitivity to recording and erasing may be optimized by making use of optical interference effects. Since these optical interference effects depend upon the film thicknesses of the dielectric layers formed on each side of the thin film recording layer, it is very important that the film thicknesses of these layers be accurately controlled during manufacture.

Generally, the thin film recording layer, the two dielectric layers, and the reflecting layer are deposited on a substrate by a sputtering process which is capable of forming high quality films with very few defects. In the prior art, film thickness during sputter deposition has been monitored by using a quartz crystal oscillator positioned within the sputtering system so that it is simultaneously coated with the thin film being deposited. The resonant frequency of the quartz crystal oscillator is continuously altered by the mass of the coating to produce a signal indicative of the film thickness.

During use of such conventional quartz crystal thickness monitors, it is necessary to replace the quartz crystal oscillator at periodic intervals when the quartz crystal becomes coated with sufficient mass to exceed its operating limits. In a mass production environment, replacement of quartz crystal thickness monitors results in undesirable down time.

Optical monitoring of film thickness during deposition is also known in the prior art. During prior art optical monitoring, the surface upon which the film is depositing is irradiated with light, and a detector is appropriately positioned to monitor the intensity of either the reflected or transmitted light. As the film forms, the intensity of the reflected or transmitted light varies with film thickness as a result of changes in film transmissivity or interference effects, and the film deposition process is halted when a predetermined intensity variation has occurred. Since each layer must be individually monitored, prior art optical thickness measurements are not appropriate for mass production. Further, during optical monitoring, the optical detectors are often sensitive to noise produced by the electrical discharge in the sputtering system, and other systematic errors may also influence the accuracy of the film thickness measurement.

SUMMARY OF THE INVENTION

It is an object of the present invention to provide a method for manufacturing an optical recording medium in which the thicknesses of the various thin film layers which form the optical recording medium are accurately controlled by means of an optical detection system which is suited for mass production.

In order to achieve this and other desirable objects, the present invention initially utilizes an optical detection system for determining a characteristic time period in which light reflected by or transmitted through the growing film undergoes a predetermined change in intensity. This change in intensity is associated with a corresponding film thickness and a deposition rate may be determined thereby. Once this deposition rate is obtained, the sputtering system is subsequently time controlled to deposit a thin film layer having a desired thickness.

The present invention encompasses a method for depositing a thin film layer to a desired thickness during a thin film deposition process in which the substrate onto which the thin film layer is being deposited is illuminated with incident light. The intensity of the incident light reflected by or transmitted through the substrate, which varies in accordance with the thickness of the depositing layer, is monitored during deposition. The time period corresponding to a predetermined variation of the intensity is measured and a deposition rate is calculated therefrom. The thin film deposition process is then controlled for a time in accordance with the deposition rate, to produce a thin film layer having the desired thickness.

For example, during deposition of a first dielectric layer on a substrate of an optical recording medium, the deposition time required to reach a maximum of the intensity of light reflected from the first dielectric layer is obtained and the deposition rate determined thereby is used as the criterion for timing the completion of deposition of the first dielectric layer as well as for timing the subsequent deposition of the second dielectric layer. By using time as the criterion, it becomes unnecessary to optically monitor each layer, and the production process is rendered more immune from noise or other systematic errors which are known to affect prior art optical monitoring systems. By utilizing the time required to arrive at a particular optical condition as a monitoring parameter to determine a deposition rate, thin film thicknesses can be controlled with high precision, with the only requirement being that the deposition rate be stable as a function of time.

BRIEF DESCRIPTION OF THE DRAWINGS

For a fuller understanding of the nature, features and advantages of the present invention, reference should be made to the following detailed description of the various preferred, but nonetheless illustrative embodiments of the invention as illustrated by and taken in conjunction with the accompanying drawings wherein:

FIG. 4 is a second exemplary embodiment of a sputtering system arranged in accordance with the present invention.

DESCRIPTION OF THE PREFERRED EMBODIMENT

Figure 1:
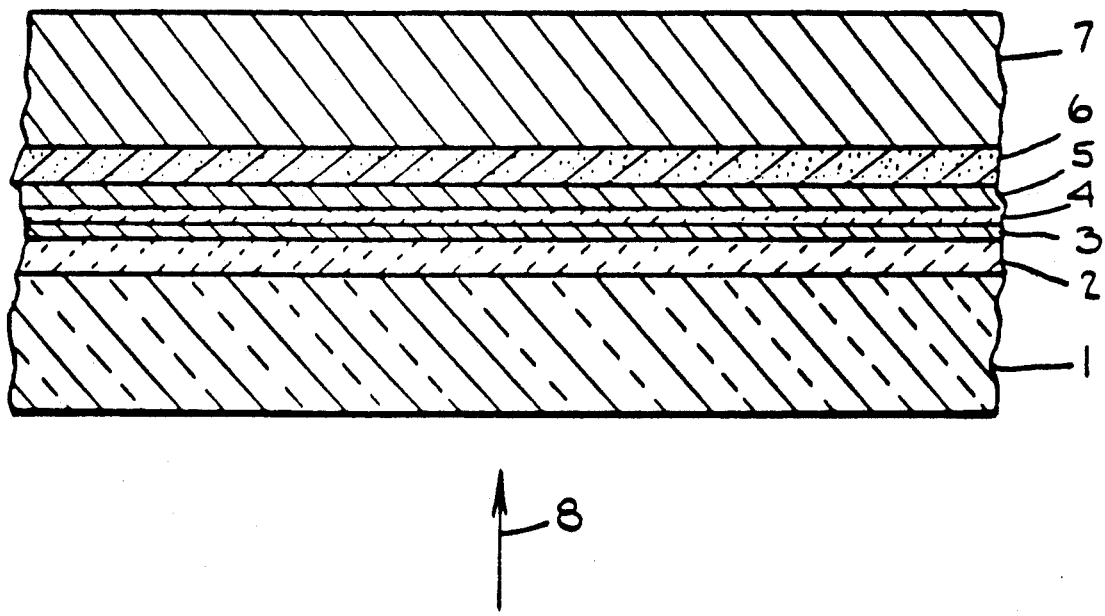
FIG. 1 is a cross-sectional view which shows the typical structure of an optical information recording medium having multiple layers of thin film materials.

With reference to FIG. 1, there is shown a cross-sectional view of an optical recording medium which includes a disc substrate 1, which may be a resin substrate formed from poly-carbonate or other similar material. The disc substrate 1 may have grooves preformed therein for guiding the laser light, shown as incident on the disc in the direction of arrow 8. Alternatively, disc substrate 1 may be a glass plate formed by the 2P process, a substrate prepared by directly forming grooves on a glass plate, or a substrate having bit rows for guiding laser light preformed therein.

As shown in FIG. 1, a first dielectric layer 2, approximately 160 nm in thickness, which may consist of a mixed film of ZnS and $SiO_2$, is formed on top of disc substrate 1. The first dielectric layer 2 has deposited thereon a thin film recording layer 3 having a thickness of approximately 20 nm. Thin film recording layer 3 may have a composition whose main component is Te-Ge-Sb. A second dielectric layer 4 covers thin film recording layer 3, and may be formed from the same composition as the first dielectric layer 2. However, the second dielectric layer 4 is generally much thinner than the first dielectric layer 2, and optimally has a thickness of approximately 20 nm. Covering the top of the second dielectric layer 4 is a reflecting layer 5, which may be an aluminum alloy. Finally, to complete the optical recording medium, a protective plate 7 is adhered to the top of the reflecting layer 5 by means of an adhesive layer 6. Protective plate 7 may be another disc.

In the structure shown in FIG. 1, the laser light for recording, erasing and reproducing the information contained therein is incident in the direction shown by arrow 8, and has an intensity which is modulated with the information. Detection of the recorded information is performed by detecting the reflected light.

Figure 2:
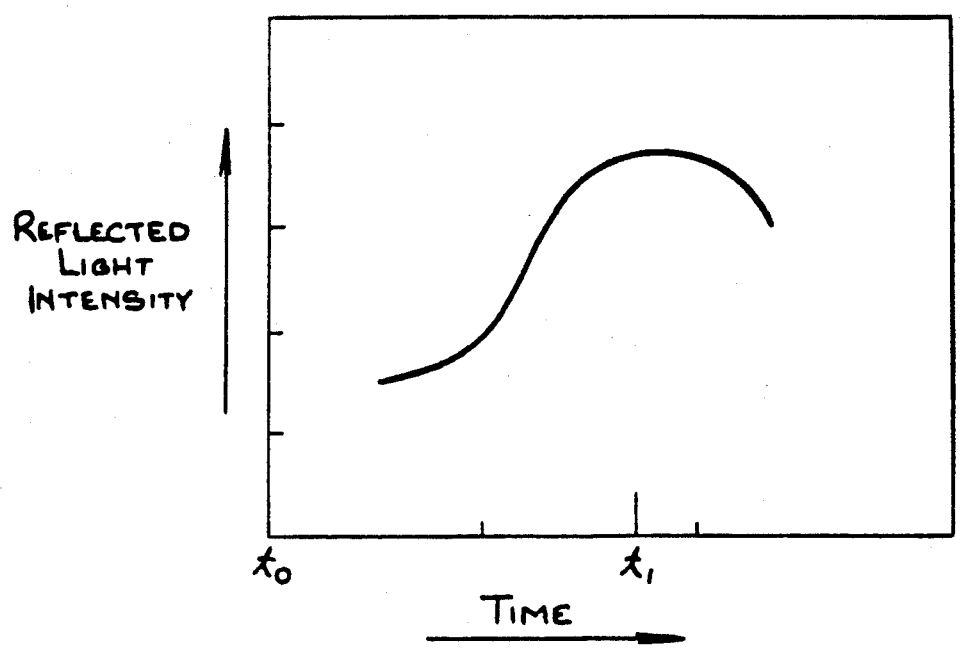
FIG. 2 shows a typical time variation in the reflected light intensity during deposition of the first dielectric layer, where the refractive index of the first dielectric layer is greater than the refractive index of the substrate.

To produce the two dielectric layers 2, 4, the thin film recording layer 3, and reflecting layer 5, a sputtering process or other suitable thin film deposition process may be utilized. By way of example, FIG. 2 illustrates the light intensity reflected as a function of time from the surface of the growing film during formation of the first dielectric layer 2 on disc substrate 1 by a sputtering process. As the film deposition progresses (assuming the refractive index $n_2$ of the dielectric layer 2 is greater than the refractive index $n_1$ of the disc substrate 1), the reflected light intensity first increases and then reaching a maximum value (as a result of interference effects) at a time $t_1$, corresponding to a film thickness of approximately $\lambda/4n_2$, where $\lambda$ is the wavelength of the incident light. The variation in the reflected light intensity depicted by the graph of FIG. 2 is monitored by an optical detector, and the time $t_1$ required to reach the maximum value of the reflected intensity is used as a criterion to determine the deposition rate by which the sputtering process is thereafter controlled to complete the deposition of the first dielectric layer 2 and to deposit the second dielectric layer 4. For example, since the deposition rate R may be written as $\lambda/4n_2t_1$, the time $t_2$ required to deposit a thickness D of the first dielectric layer 2, i.e. $t_2 = D/R = 4n_2Dt_1/\lambda$ may be determined and the deposition continued for a total time equal to $t_2$.

In the case where the index of refraction $n_2$ of the dielectric layer 2 is less than the index of refraction $n_1$ of the disc substrate 1, the reflectance will initially decrease during deposition and will reach a minimum value when the dielectric layer 2 attains a thickness of $\lambda/4n_2$. As described above, the deposition rate may thereby be determined and the deposition time controlled for a time $t_2$ required to deposit a thickness D of the dielectric layer 2. Since the deposition rate of the second dielectric layer 4 is the same as that of the first dielectric layer 2, the time required to deposit the requisite thickness of the second dielectric layer may also be determined based on the deposition rate.

As to the deposition of thin film recording layer 3, a test substrate is first utilized to determine the deposition rate of the recording layer 3, and the recording layer 3 is thereafter deposited to the requisite thickness in accordance with that predetermined deposition rate. Optical monitoring is not used for controlling the deposition of either the recording layer 3 or the second dielectric layer 4 because their required thicknesses are too thin to generate a maximum or minimum in the monitored light intensity.

Figure 3:
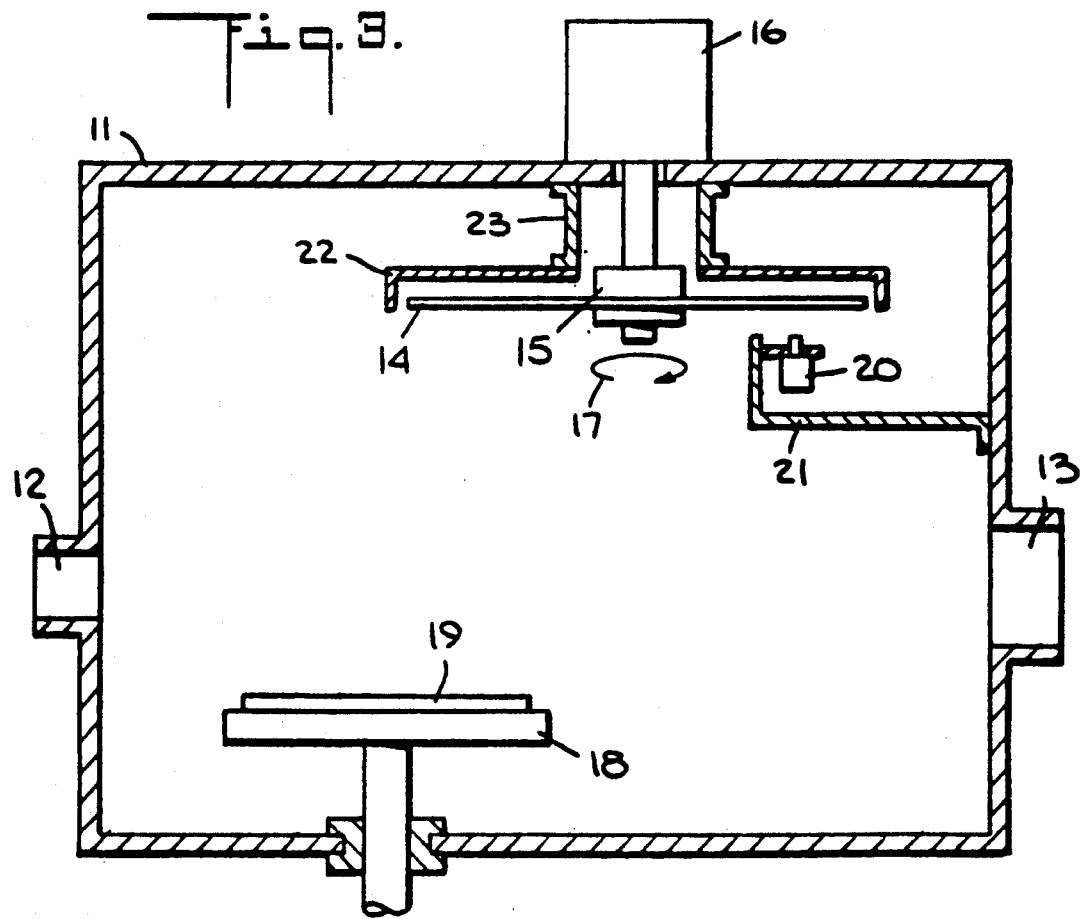
FIG. 3 shows a sputtering system arranged in accordance with an exemplary embodiment of the invention.

FIG. 3 more generally shows how a sputtering system would be utilized in accordance with the present invention to form thin film layers of accurate thicknesses by controlling the time for deposition in accordance with the deposition rate initially determined by optical monitoring.

FIG. 3 generally shows, in a cross-sectional view, a vacuum chamber 11 having a gas inlet port 12, and an exhaust port 13 which is connected to a vacuum pump. Substrate 14 is attached to a rotatable mount 15 which may be rotated (as shown by the direction of arrow 17) by a motor 16. Facing substrate 14 is a sputtering target 19 which is mounted to electrode 18. Electrode 18 is conventionally driven by a high frequency RF voltage source to produce an electrical discharge in the space between the sputtering target 19 and the substrate 14. Affixed to vacuum chamber 11 by means of a mounting bracket 21 is an optical monitoring device 20 which includes a light source and detector. If the optical property being monitored is the transmitted intensity, rather than the reflected intensity, the optical monitoring device 20 is arranged to have a light source on one side of the substrate 14, with a separate detector positioned on the other side thereof to monitor the transmitted light. To prevent any film from forming on the back of substrate 14, a deposition baffle 22 is positioned around the back side of substrate 14 and attached to the vacuum chamber 11 by means of a fixture 23.

In operation, the vacuum chamber 11 is first exhausted to a base vacuum, after which an inert gas such as argon is introduced into the vacuum chamber 11 through the gas inlet port 12. A high frequency RF voltage is thereafter applied to electrode 18, causing an electrical discharge to be formed within the vacuum chamber 11 and material from the sputtering target 19 to be ejected by the impact of energetic argon ions produced in the electrical discharge. The material ejected from the sputtering target 19 in this manner deposits on substrate 14 to gradually form a thin film layer.

As explained with respect to FIG. 2, accurate control of the film thickness of the first dielectric layer 2 and the second dielectric layer 4 is provided in the preferred embodiment of the invention by controlling the time of sputter deposition, in accordance with the time $t_1$ needed to reach the maximum or minimum reflected light intensity as measured by the optical monitoring device 20. Since the film thickness of the second dielectric layer 4 is as thin as about 20 nm, a maximum or minimum value in the reflected light intensity is not reached during formation of the second dielectric layer 4. Thus, in order to form the second dielectric layer 4 by a deposition time criterion, an appropriate fraction of the time required to reach the maximum or minimum reflected light intensity during deposition of the first dielectric layer 2, is utilized as the criterion. This technique greatly improves the accuracy and stability of the film thickness of the second dielectric layer 4.

FIG. 4 schematically shows a second embodiment for a sputtering system, in which a thin film may be simultaneously formed on a large number of disc substrates by utilizing a process control in accordance with the present invention. In FIG. 4, the sputtering system is enclosed within a vacuum chamber 24 having a pallet 25 on which a plurality of disc substrates 26 may be mounted. The pallet 25 is rotatable about shaft 27. An inert gas such as argon is introduced through inlet port 30, and is exhausted through exhaust port 31 so that a partial pressure sufficient to sustain an electrical discharge is present within vacuum chamber 24. An optical monitoring device 32 is positioned by bracket 33 so that light emitted therefrom and reflected from the substrates 26 as they rotate may be detected.

As described above, the time required to obtain a predetermined variation in the reflected light intensity is initially determined and a deposition rate is calculated therefrom. The deposition rate is thereafter used as the criterion by which the sputtering time is controlled for deposition of the first and second dielectric layers.

With reference to the sputtering system shown in FIG. 4, in which a plurality of disc substrates 26 are mounted on a pallet 25, a systematic error may be introduced if the optical monitoring device 32 detects light reflected from the rim of the pallet 25 in addition to the light reflected from the disc substrates 26. Thus, in order to properly limit the detected light to only that which is reflected from the disc substrates 26, the rotation of the pallet 25 is synchronized with respect to the operation of the optical monitoring device 32, such that only the quantity of light reflected from the disc substrates 26 is detected thereby. To do so, a stepping motor may be utilized to rotate shaft 27 and a synchronization signal derived from the stepping motor may be used to switch on the optical monitoring device 32 at the appropriate times.

Although the invention disclosed herein has been described with reference to particular embodiments, it is to be understood that these embodiments are merely illustrative of the different aspects and features of the invention. As such, a person skilled in the art may make numerous modifications to the illustrative embodiments described herein, and other arrangements may be devised to implement the disclosed invention which will fall within the spirit and scope of the invention described and claimed herein.

What we claim is:

1. A method for depositing a thin film layer of a multi-layer structure to a desired thickness during a thin film deposition process comprising the steps of:
   (a) depositing said thin film layer onto a substrate;
   (b) illuminating said substrate with incident light during said deposition;
   (c) monitoring the intensity of said incident light which interacts with said substrate during deposition of said thin film layer, said intensity varying in accordance with the thickness of said thin film layer;
   (d) determining a time period corresponding to a predetermined variation in said intensity and calculating therefrom a deposition rate; and
   (e) continuing to deposit said thin film layer to said desired thickness by controlling said thin film deposition process for a time in accordance with said calculated deposition rate.

2. The method of claim 1 wherein the intensity of light reflected from the substrate and said thin film layer is monitored.

3. The method of claim 1 wherein the intensity of light transmitted through said substrate and said thin film layer is monitored.

4. The method of claim 1 wherein said time period is the time required to reach a maximum of said intensity.

5. The method of claim 1 wherein said time period is the time required to reach a minimum of said intensity.

6. The method of claim 1 wherein said incident light is incident on said substrate on a side whereon said thin film layer is being deposited.

7. The method of claim 1, further including a step (e) of depositing a second thin film layer of said multi-layer structure for a time determined in accordance with said calculated deposition rate.

8. A method for manufacturing an optical recording medium in which a first dielectric layer, a recording layer and a second dielectric layer are sequentially deposited on a plurality of substrates which are rotating on a pallet, comprising the steps of:
   a) illuminating said plurality of substrates with incident light;
   b) monitoring the intensity of said incident light interacting with said plurality of substrates during deposition of said first dielectric layer thereon, said intensity varying in accordance with the thickness of said first dielectric layer;

c) determining a time period corresponding to a predetermined variation in said intensity and calculating therefrom a deposition rate;

d) continuing to deposit said first dielectric layer to said desired thickness by controlling the deposition for a time in accordance with said calculated deposition rate;

e) depositing said recording layer for a time determined in accordance with a previously determined deposition rate to form said recording layer having a desired thickness; and f) depositing said second dielectric layer for a time determined in accordance with said calculated deposition rate of said first dielectric layer to form said second dielectric layer having a desired thickness.

9. The method of claim 8 wherein said time period corresponds to a time required to reach a maximum of said intensity.

10. The method of claim 8 wherein said time period corresponds to a time required to reach a minimum of said intensity.

11. The method of claim 8 wherein the time period determined during deposition of said first dielectric layer is the time required to reach a maximum of said reflected intensity.

12. The method of claim 8 wherein the time period determined during deposition of said first dielectric layer is the time required to reach a minimum of said reflected intensity.

13. The method of claim 8 wherein said incident light is incident on said substrate on a side whereon said first dielectric layer is depositing.

14. The method of claim 8 wherein monitoring of said intensity is performed in synchronization with the rotation of said pallet.

15. A method for manufacturing an optical recording medium in which a first dielectric layer, a recording layer and a second dielectric layer are sequentially deposited on a substrate comprising the steps of:

a) depositing said first dielectric layer to a desired thickness by illuminating said substrate with incident light, monitoring the intensity of said incident light interacting with said substrate and said first dielectric layer during depositing of said first dielectric layer, determining the time required to reach a predetermined variation of said intensity and calculating a deposition rate therefrom; and continuing to deposit said first dielectric layer for a time determined in accordance with said deposition rate to form said first dielectric layer having a desired thickness;

(b) depositing said recording layer for a time determined in accordance with a deposition rate previously determined for said recording layer to form said recording layer having a desired thickness; and (c) depositing said second dielectric layer for a time determined in accordance with the deposition rate of said first dielectric layer to form said second dielectric layer having a desired thickness.

16. The method of claim 15 wherein said time determined in step (a) corresponds to the time required to reach a maximum of said intensity.

17. The method of claim 15 wherein said time determined in step (a) corresponds to the time required to reach a minimum of said intensity.

18. The method of claim 15 wherein said intensity is the intensity of said incident light reflected during deposition of said first dielectric layer.

19. The method of claim 15 wherein said incident light is incident on said substrate on a side whereon said first dielectric layer is being deposited.

20. A method for forming first and second layers of material on a substrate, comprising the steps of:

a) illuminating said substrate with incident light;

b) monitoring the intensity of said incident light which interacts with said substrate and said first layer of material during deposition of said first layer of material, said intensity varying in accordance with the thickness of said first layer of material;

c) determining a time period corresponding to a predetermined variation in said intensity and calculating therefrom a deposition rate;

d) continuing to deposit said first layer of material for a time determined in accordance with said deposition rate to form a first layer of material having a desired thickness; and e) depositing a second layer of material on said first layer of material for a time determined in accordance with a deposition rate previously determined for said second layer of material to form a second layer of material having a desired thickness.

21. The method of claim 20 wherein step (b) monitors the intensity of said incident light reflected from said substrate and said first layer of material.

22. The method of claim 20 wherein said predetermined variation in said intensity corresponds to a maximum in the reflected intensity.

23. The method of claim 20 wherein said predetermined variation in said intensity corresponds to a minimum in the reflected intensity.

24. A method for manufacturing a thin film structure on a substrate having first and second layers of a first material separated by at least one second material, comprising the steps of:

a) illuminating said substrate with incident light;

b) monitoring the intensity of said incident light which interacts with said substrate and said first material during deposition of said first layer of said first material;

c) determining the time for said intensity to exhibit a predetermined variation and calculating therefrom a deposition rate;

d) continuing to deposit said first layer of said first material for a time determined in accordance with said calculated deposition rate to form a first layer of said first material having a desired thickness;

e) depositing one or more layers of said second material; and f) subsequently depositing a second layer of said first material for a time determined in accordance with said calculated deposition rate of said first layer of said first material to form a second layer of said first material having a desired thickness.

25. The method of claim 24 wherein the intensity of light reflected from the substrate and said first material is monitored.

26. The method of claim 25 wherein said deposition rate is calculated by determining the time for said reflected intensity to exhibit a maximum value.

27. The method of claim 25 wherein said deposition rate is calculated by determining the time for said reflected intensity to exhibit a minimum value.

* * * * *